US012644577B2

(12) United States Patent　　(10) Patent No.:　US 12,644,577 B2
Jigi et al.　　　　　　　　　　　(45) Date of Patent:　　　Jun. 2, 2026

(54) CABIN ILLUMINATION DEVICE

(71) Applicant: Panasonic Automotive Systems Co., Ltd., Kanagawa (JP)

(72) Inventors: Masahiro Jigi, Fukui (JP); Mayuko Okada, Fukui (JP); Yuhei Chida, Fukui (JP); Kenta Yamazaki, Fukui (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 0 days.

(21) Appl. No.: 19/084,320

(22) Filed: Mar. 19, 2025

(65) Prior Publication Data

US 2025/0305658 A1　　Oct. 2, 2025

(30) Foreign Application Priority Data

Mar. 29, 2024　(JP) ................................. 2024-055887

(51) Int. Cl.
F21V 7/09　　　　(2006.01)
B60Q 3/258　　　(2017.01)
(Continued)

(52) U.S. Cl.
CPC .................. F21V 7/09 (2013.01); B60Q 3/60 (2017.02); B60Q 3/74 (2017.02); A47G 2200/08 (2013.01); B60Q 3/258 (2017.02); B60Q 3/43 (2017.02); B60Q 3/51 (2017.02); B60Q 3/72 (2017.02); B60Q 3/745 (2017.02); F21S 8/04 (2013.01); F21S 8/043 (2013.01); F21V 7/0008 (2013.01); F21V 7/0016 (2013.01); F21V 7/0025 (2013.01); F21V 7/0033 (2013.01); F21V 7/0041 (2013.01);
(Continued)

(58) Field of Classification Search
CPC .... F21V 7/0008; F21V 7/0016; F21V 7/0025; F21V 7/0033; F21V 7/0041; F21V 7/048; F21V 7/09; F21V 7/0091; F21Y 2101/00; F21Y 2109/00; F21S 8/04; F21S 8/043; G02B 6/0021; B60Q 3/258; B60Q 3/43; B60Q 3/51; B60Q 3/72; B60Q 3/74; B60Q 3/745; G02F 1/133603; G02F 1/133605; A47G 2200/08
See application file for complete search history.

(56) References Cited

U.S. PATENT DOCUMENTS 1,900,551 A * 3/1933 Guth ....................... F21V 7/005
　　　　　　　　　　　　　　　　　　　362/348
6,913,378 B2 * 7/2005 Ho .......................... F21V 7/005
　　　　　　　　　　　　　　　　　　　362/346
(Continued)

FOREIGN PATENT DOCUMENTS

JP　　　　2007045185 A　　2/2007

*Primary Examiner* — Colin J Cattanach
(74) *Attorney, Agent, or Firm* — Seed Intellectual Property Law Group LLP

(57)　　　　　　　ABSTRACT

A cabin illumination device is provided on a wall surface of a cabin of a vehicle and illuminates the cabin and includes: a light source disposed to emit light away from the wall surface; and a reflective member disposed to intersect a light axis of light emitted by the light source. The reflective member includes a first protruded surface disposed to intersect the light axis of the light source, and a portion of the reflective member is sloped downward in a direction away from an intersection of the light axis and the first protruded surface.

16 Claims, 5 Drawing Sheets

(51) Int. Cl.

| | |
|---|---|
| *B60Q 3/43* | (2017.01) |
| *B60Q 3/51* | (2017.01) |
| *B60Q 3/60* | (2017.01) |
| *B60Q 3/72* | (2017.01) |
| *B60Q 3/74* | (2017.01) |
| *F21S 8/04* | (2006.01) |
| *F21V 7/00* | (2006.01) |
| *F21V 7/04* | (2006.01) |
| *F21V 8/00* | (2006.01) |
| *G02F 1/13357* | (2006.01) |

(52) U.S. Cl.

CPC ............. *F21V 7/0091* (2013.01); *F21V 7/048* (2013.01); *G02B 6/0021* (2013.01); *G02F 1/133603* (2013.01); *G02F 1/133605* (2013.01)

(56) References Cited

U.S. PATENT DOCUMENTS

| | | | | |
|---|---|---|---|---|
| 2004/0062034 | A1* | 4/2004 | Hsieh ...................... | G09F 13/14 |
| | | | | 362/97.1 |
| 2005/0041173 | A1* | 2/2005 | Kubota ............. | G02F 1/133611 |
| | | | | 349/61 |
| 2006/0279959 | A1* | 12/2006 | Yabashi ................... | B60Q 3/57 |
| | | | | 362/253 |
| 2015/0103522 | A1* | 4/2015 | Liu .................... | G02B 19/0066 |
| | | | | 362/235 |
| 2025/0155100 | A1* | 5/2025 | Hayashi ................ | F21S 41/334 |

* cited by examiner

CABIN ILLUMINATION DEVICE

CROSS REFERENCE TO RELATED APPLICATION

The present application is based on and claims priority of Japanese Patent Application No. 2024-055887 filed on Mar. 29, 2024.

FIELD

The present disclosure relates to a cabin illumination device.

BACKGROUND

Patent Literature (PTL) 1 discloses an in-vehicle air purifier, in which a gap is provided between the ceiling and the casing, and an indirect lighting including an LED element and a lens is provided in the gap.

CITATION LIST

Patent Literature

PTL 1: Japanese Unexamined Patent Application Publication No. 2007-45185

SUMMARY

The in-vehicle air purifier according to PLT 1 can be improved upon.

In view of this, a cabin illumination device according to one aspect of the present disclosure is capable of improving upon the above related art.

A cabin illumination device according to one aspect of the present disclosure is a cabin illumination device that is provided on a wall surface of a cabin of a vehicle and illuminates the cabin. The cabin illumination device includes: a light source disposed to emit light away from the wall surface; and a reflective member disposed to intersect a light axis of light emitted by the light source. The reflective member includes a first protruded surface disposed to intersect the light axis of the light source, and a portion of the reflective member is sloped downward in a direction away from an intersection of the light axis and the first protruded surface.

The cabin illumination device according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

The following specifically describes one or more embodiments with reference to the drawings.

Note that each of the one or more embodiments described below shows a general or specific example. The numerical values, shapes, structural elements, the arrangement positions and connection of the structural elements, etc. shown in the following one or more embodiments are mere examples, and are not intended to limit the scope of the present disclosure. In addition, among the structural elements in the following one or more embodiments, structural elements not recited in any one of the independent claims are described as optional structural elements.

Moreover, the respective figures are schematic diagrams and are not necessarily precise illustrations. Accordingly, for example, the figures are not necessarily to scale. Moreover, configurations that are essentially the same share like reference signs in the figures. Accordingly, overlapping explanations thereof are omitted or simplified.

Moreover, in the following one or more embodiments, in FIG. 1B, a predetermine direction that is orthogonal to the thickness direction of a cabin illumination device, which has a low profile, is defined as the X-axis positive direction, and a direction that is orthogonal to the X-axis positive direction is defined as the Y-axis positive direction. A direction perpendicular to the X-axis positive direction and the Y-axis positive direction, which is the thickness direction of the low-profile cabin illumination device, is defined as the Z-axis positive direction. The directions in FIG. 1B will also be applied to FIG. 2 and the subsequent figures.

Moreover, in the following one or more embodiments, expressions such as an X-axis direction, a rectangular shape, and being substantially parallel are used. For example, the X-axis direction, the rectangular shape, and being substantially parallel mean not only the complete X-axis direction, a complete rectangular shape, and being completely parallel, but also include a substantial X-axis direction, a substantial rectangular shape, and being substantially parallel, in other words, also mean that an error of about a few percent or several percent may be included. Moreover, the X-axis direction, a rectangular shape, and being substantially parallel mean the X-axis direction, a rectangular shape, and being substantially parallel in a scope in which effects yielded by the present disclosure can be achieved. The same also applies to other expressions that indicate the meanings of "direction", "shape", "substantial", and "substantially".

Embodiment

<Configuration>

Hereinafter, cabin illumination device 1 according to the present disclosure will be specifically described with reference to FIG. 1A to FIG. 4.

Figure 1A:
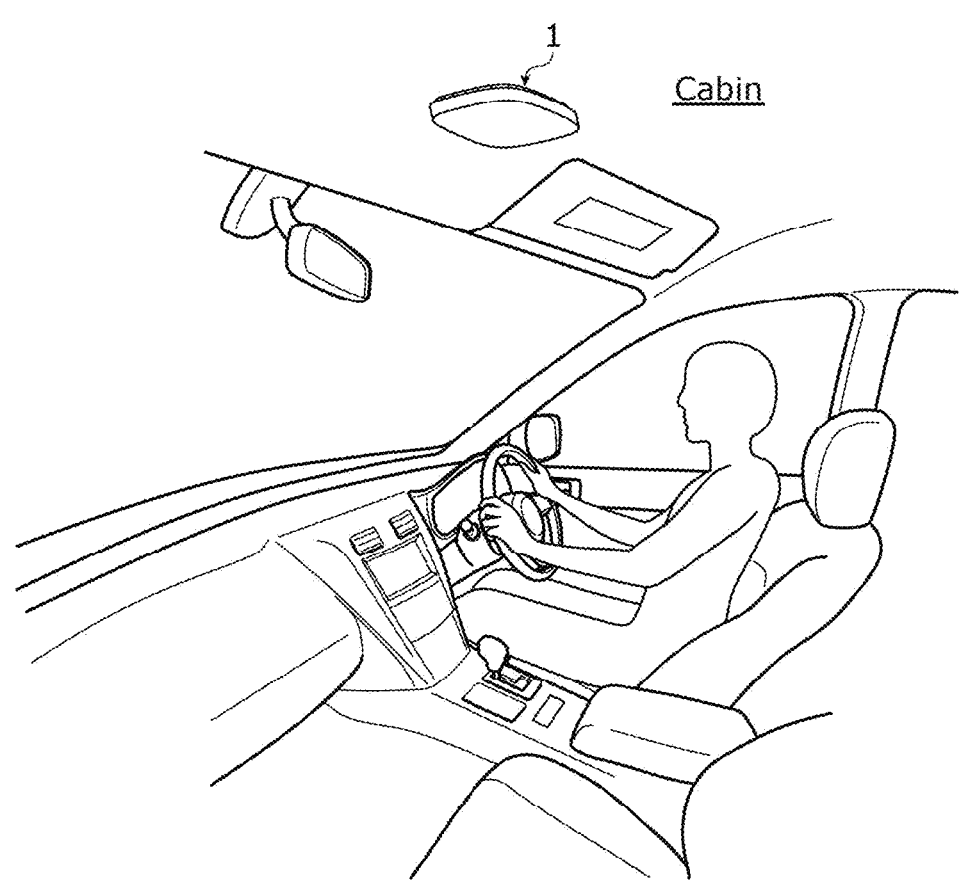
FIG. 1A is a schematic perspective view illustrating a cabin of a vehicle in which a cabin illumination device according to an embodiment is disposed.
Figure 2:
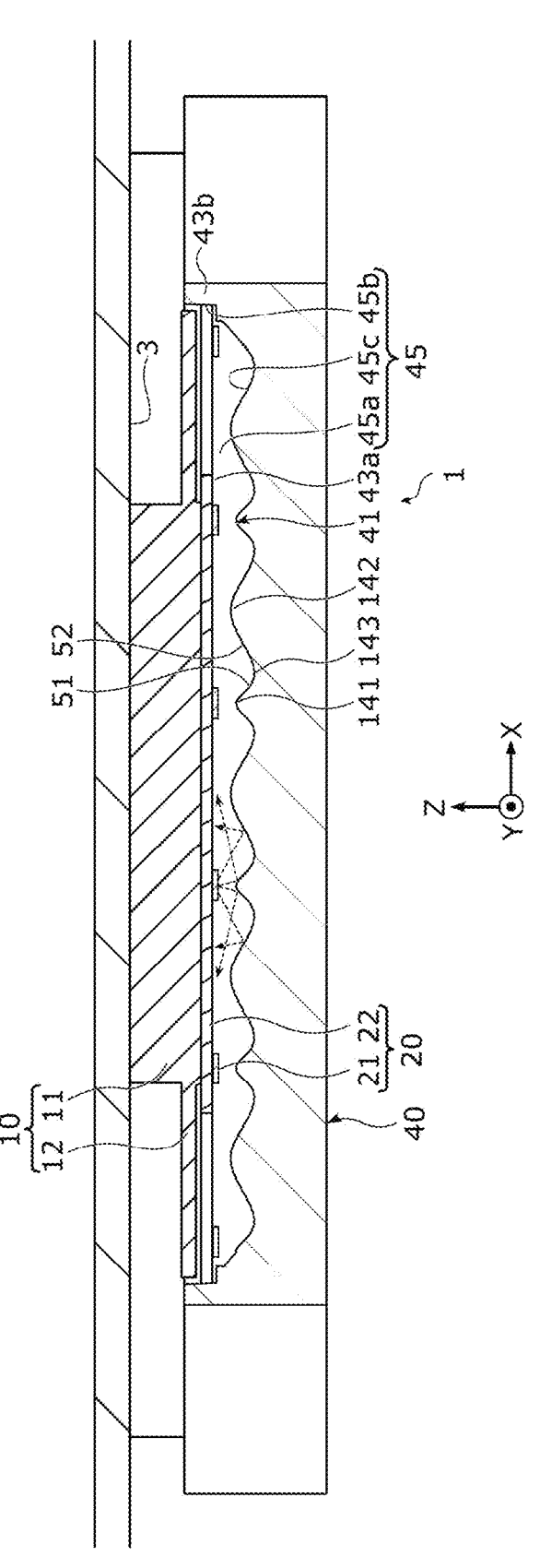
FIG. 2 is a cross-sectional view of the cabin illumination device, which is taken along the line A-A in FIG. 1B.
Figure 3:
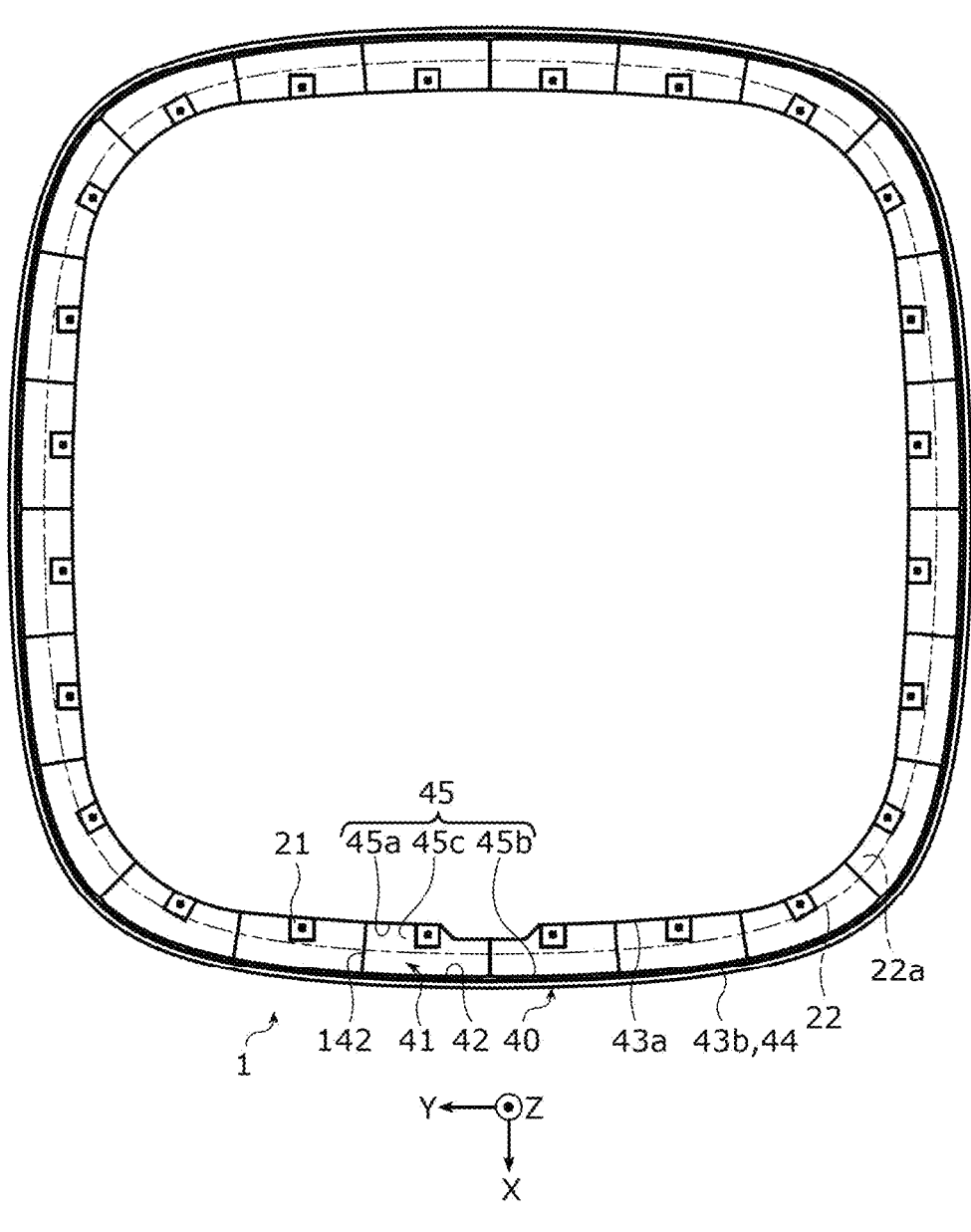
FIG. 3 is a plan view illustrating a plurality of light sources and a reflective member.
Figure 4:
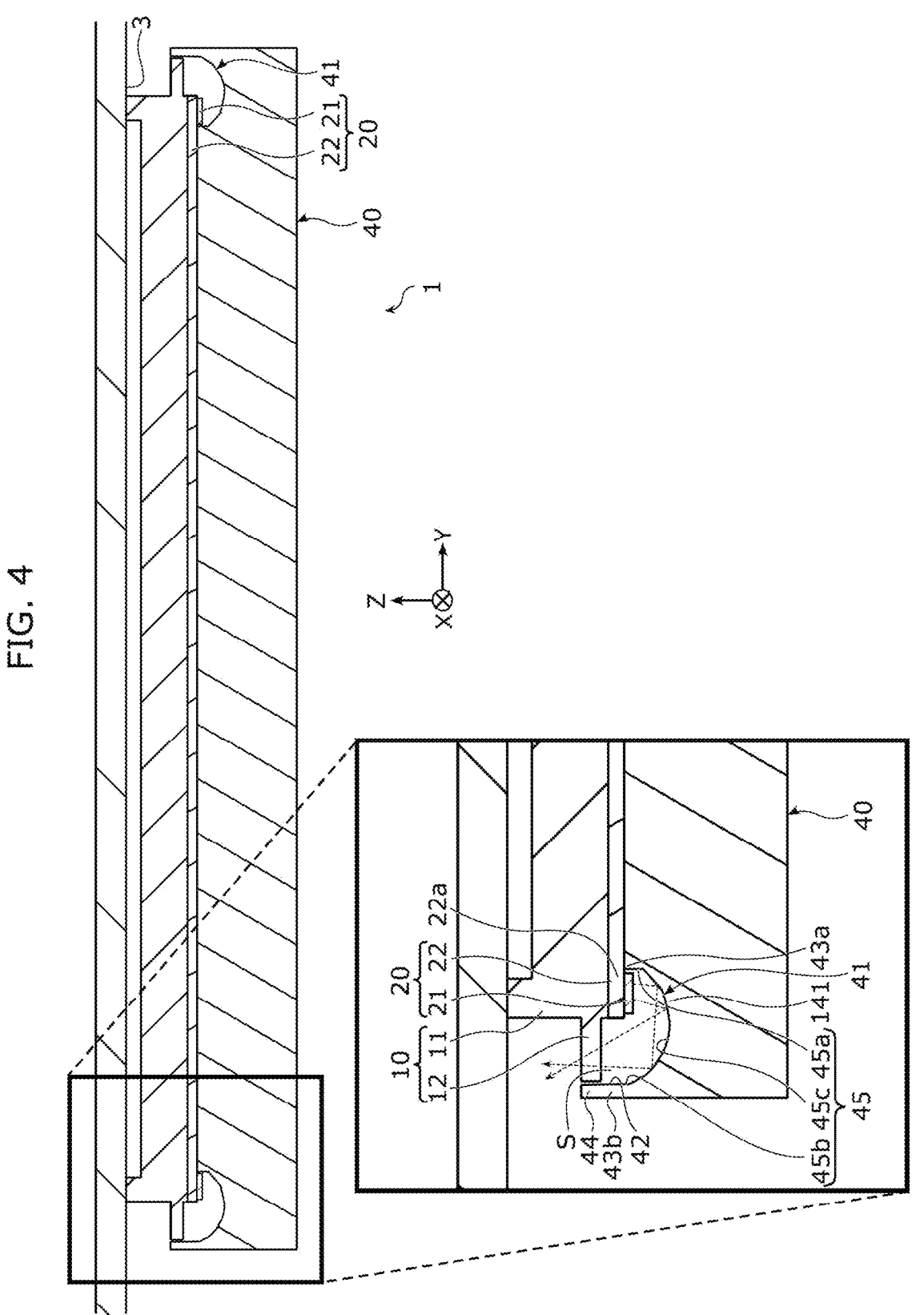
FIG. 4 is a cross-sectional view of the cabin illumination device, which is taken along the line B-B in FIG. 1B.

FIG. 1A is a schematic perspective view illustrating a cabin of a vehicle in which cabin illumination device 1 according to an embodiment is disposed. FIG. 1B is a schematic perspective view of cabin illumination device 1 according to the embodiment. In (a) in FIG. 1B, a state in which cabin illumination device 1 is turned off is illustrated. In (b) in FIG. 1B, a state in which cabin illumination device 1 is turned on is illustrated. FIG. 2 is a cross-sectional view of cabin illumination device 1, which is taken along the line A-A in FIG. 1B. FIG. 3 is a plan view illustrating a plurality of light sources 21 and reflective member 40. Substrate 22 is indicated by a dash double dot line. FIG. 4 is a cross-sectional view of cabin illumination device 1, which is taken along the line B-B in FIG. 1B.

Figure 1B:
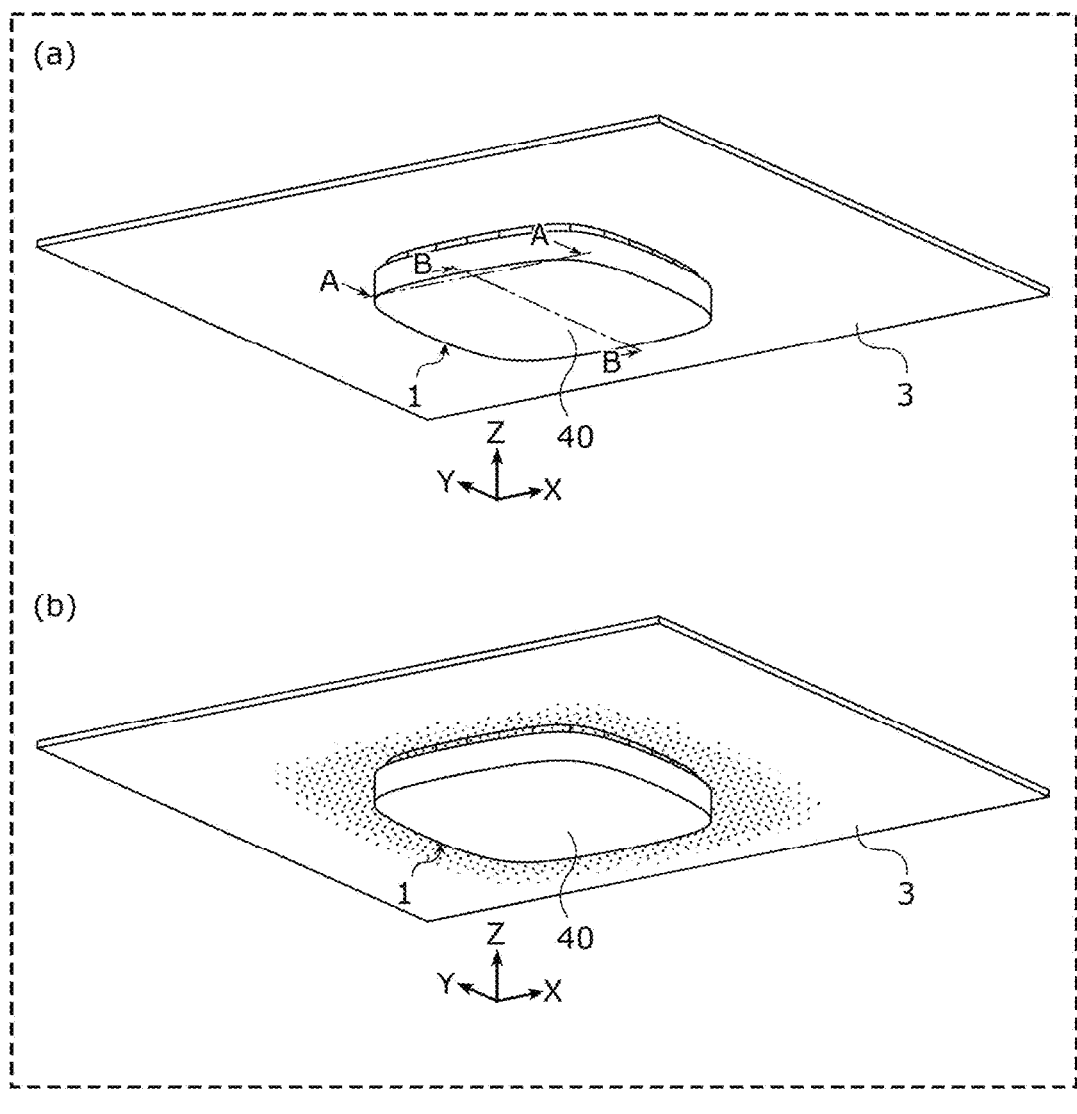
FIG. 1B is a schematic perspective view of the cabin illumination device according to the embodiment.

As illustrated in FIG. 1A, and (a) and (b) in FIG. 1B, cabin illumination device 1 is an interior light that can illuminate a cabin of a vehicle and is provided on wall surface 3 of the cabin. Note that cabin illumination device 1 may be, for example, an illumination device integrated into vehicle interior equipment provided inside the cabin, or an illumination device provided to an overhead console. In the present embodiment, wall surface 3 is set to be substantially parallel to the XY plane.

Cabin illumination device 1 is a plate-shaped device that is substantially parallel to the XY plane and has a low profile in the Z-axis direction. Cabin illumination device 1 has a rectangular shape or a circular shape in a plan view. The shape of cabin illumination device 1 may be any other known shapes, and should not be construed to be limited to the shapes in the present embodiment. The present embodiment illustrates cabin illumination device 1 having a rectangular shape.

More specifically, as illustrated in FIG. 1B and FIG. 2, cabin illumination device 1 includes support member 10, light-emitting module 20, an illumination controller, which is not illustrated in the figures, and a device main body.

Support member 10 is provided on wall surface 3 of the cabin. In the present embodiment, support member 10 is provided on wall surface 3 of the ceiling of the cabin. Support member 10 is provided on wall surface 3 with one or more fastening members such as bolts or screws, which are not illustrated in the figures.

Support member 10 is a member that has a low profile in the Z-axis direction and has a rectangular plate-shape or circular plate-shape corresponding the shape of cabin illumination device 1. The shape of support member 10 may be any other known shapes, and should not be construed to be limited to the shapes in the present embodiment. Support member 10 is disposed on wall surface 3 along wall surface 3 of the cabin, i.e., to be substantially parallel to the XY plane.

Support member 10 may include an illumination controller for controlling light-emitting module 20. Furthermore, support member 10 may also include a power supply circuit for supplying direct current to light-emitting module 20. In this case, the power supply circuit may be included as a structural element of cabin illumination device 1.

More specifically, support member 10 supports substrate 22 of light-emitting module 20, and includes support main body 11 provided on wall surface 3 of the cabin and brim 12 that is light-transmissive.

Support main body 11 is a member that has a low profile in the Z-axis direction, and has a rectangular or circular shape corresponding the shape of cabin illumination device 1. The shape of support main body 11 may be any other known shapes, and should not be construed to be limited to the shapes in the present embodiment. Light-emitting module 20 is provided on the surface of support main body 11 in the Z-axis negative direction. On the peripheral side surface, which has a substantially annular shape, of support main body 11, brim 12 having a substantially annular shape and extending in the radially outward direction of support main body 11 is formed. Brim 12 is formed along the substantially annular-shaped peripheral side surface of support main body 11.

Entire support member 10 may include a light-transmissive material, or only brim 12 may include a light-transmissive material. Note that brim 12 may have a function of diffusing light. For example, brim 12 may be grain processed, or a light-diffusing material may be applied to brim 12. An example of the light-transmissive material is acrylic resin.

Light-emitting module 20 includes a plurality of light sources 21 and substrate 22.

Each of light sources 21 can emit white light, for example. Each of light sources 21 is a light-emitting diode (LED), for example. More specifically, each of light sources 21 is, for example, a blue light-emitting element that emits blue light. Note that, as light sources 21, green light-emitting elements that emit green light and/or red light-emitting elements that emit red light may also be used. In each of light sources 21, a yellow phosphor, which is a wavelength converting material, is provided on the light-emitting side of the blue light-emitting element. A yellow phosphor is a phosphor that emits yellow light by being excited by blue light. Each of light sources 21 can emit white light as mixed light of blue light and yellow light. In other words, light sources 21 can emit light that can illuminate inside the cabin.

Light sources 21 are arranged along outer peripheral edge portion 22a of substrate 22. In the embodiment, since substrate 22 is has a circular shape or a rectangular shape corresponding to the shape of cabin illumination device 1, light sources 21 are arranged substantially annularly along outer peripheral edge portion 22a of substrate 22.

Substrate 22 is, for example, a rigid substrate, but may be a flexible substrate. Substrate 22 includes, for example, pattern wiring for supplying direct current from the power supply circuit to each of light sources 21.

As illustrated in FIG. 2 and FIG. 3, substrate 22 is provided on a surface of support member 10 that is located in the Z-axis negative direction in an orientation substantially parallel to the XY plane. On the surface of substrate 22 that is located in the Z-axis negative direction, a plurality of light sources 21 are provided. In other words, each of light sources 21 are arranged in cabin illumination device 1 with the light axis substantially parallel to the Z-axis direction, and to emit light in the Z-axis negative direction. Therefore, when cabin illumination device 1 is provided on wall surface 3 of the ceiling of the cabin, each of light sources 21 emits light in the vertically downward direction. The light emitted from each of light sources 21 in the vertically downward direction is reflected by reflective member 40, which will be described later, and incidents on wall surface 3 of the cabin. Accordingly, the cabin is illuminated indirectly. The light axis is the axis of main light emitted by light source 21.

The illumination controller can control the lighting mode of light-emitting module 20. For example, the illumination controller may include a dimming control circuit that can control dimming of each of light sources 21 and a color control circuit that can adjust the color of each of light sources 21. In this case, the illumination controller includes a dimming function that can dim the light emitted by each of light sources 21 and a color-adjusting function that can adjust the color of the light emitted by each of light sources 21. The illumination controller can implement the dimming function and the color-adjusting function by controlling the amount of current supplied from the power supply circuit to each of light sources 21.

Moreover, the illumination controller can control, for example, turning on, turning off, and illumination time of each of light sources 21 by controlling the current supplied to light-emitting module 20.

The illumination controller is implemented by, for example, large scale integration (LSI), which is an integrated circuit (IC). Note that, the IC should not be construed to be limited to the LSI, and may also be a dedicated circuit or a general-purpose processor. In the embodiment, the illumination controller is a microcontroller. The microcontroller includes, for example, non-volatile memory in which a program is stored, volatile memory, which is a temporary storage area for executing the program, an input-output port, and a processor that executes the program. Moreover, the illumination controller may be a field programmable gate array (FPGA), or a reconfigurable processor capable of reconfiguring the connections and settings of circuit cells inside the LSI. The functions to be executed by the illumination controller may be implemented by software or hardware.

As illustrated in FIG. 2, the device main body is a member that has a low profile in the Z-axis direction and has a rectangular or circular plate-shape corresponding the shape of cabin illumination device 1. The shape of the device main body may be any other known shapes, and should not be construed to be limited to the shapes in the present embodiment. The device main body is provided along wall surface 3 of the cabin, i.e., provided on a surface of substrate 22 that is located in the Z-axis negative direction to be substantially parallel to the XY plane.

In the central portion of the device main body, a storage space for storing small items may be formed, another illumination device may be provided, audio equipment may be provided, or an operation panel for operating the interior equipment may be provided.

In the outer peripheral edge portion of the device main body, groove 41 having a substantially annular shape is formed along the outer peripheral edge portion of the device main body. Groove 41 is recessed in the Z-axis negative direction from the surface located in the Z-axis positive direction of the device main body.

Substrate 22 of light-emitting module 20 is disposed to project in the radial direction (along the XY plane) from the central portion of the device main body surrounded by groove 41 of the device main body when the device main body is provided to light-emitting module 20. Since light sources 21 are disposed along outer peripheral edge portion 22a of substrate 22, groove 41 of the device main body is provided in a surface located in the Z-axis negative direction in a part in which the protruded portion of substrate 22 is located. Therefore, light sources 21 are disposed in the longitudinal direction of groove 41. It can be said that groove 41 is formed in the arrangement direction of light sources 21.

The device main body may be reflective member 40 that reflects light emitted by each of light sources 21 (has a light-reflecting function). Moreover, groove 41 of the device main body may be reflective member 40 that reflects the light emitted by each of light sources 21. The present embodiment describes a case where the device main body is reflective member 40.

Reflective member 40 is a member that includes a white resin material; a member that includes a metal material, etc. painted white; a member that includes a metal material such as aluminum; or a member that includes a resin material, etc. to which a metal film is added.

Light sources 21 are located in groove 41. Reflective member 40 is disposed to intersect the light axis of light emitted by each of light sources 21. With this, reflective member 40 can reflect light emitted by each of light sources 21 toward wall surface 3 of the cabin. The light axis is an axis in the Z-axis negative direction from light source 21.

Here, the configuration of groove 41 formed in reflective member 40 of the device main body is described in more detail.

As illustrated in FIG. 4, groove 41 includes one edge portion 43a and other edge portion 43b that define opening 42 of groove 41. One edge portion 43a is opposite other edge portion 43b with opening 42 in between. As illustrated in FIG. 3, in the present embodiment, since groove 41 has a substantially annular shape as viewed in the Z-axis direction, one edge portion 43a and other edge portion 43b also have substantially annular shapes. One edge portion 43a is located on the inner peripheral side of groove 41, and other edge portion 43b is located on the outer peripheral side of groove 41 and has a diameter larger than the diameter of one edge portion 43a.

As illustrated in FIG. 4, substrate 22 of light-emitting module 20 is disposed to project from one edge portion 43a toward other edge portion 43b when the device main body is provided to light-emitting module 20. Here, substrate 22 is disposed not to close opening 42 between one edge portion 43a and other edge portion 43b. In other words, gap S is formed between outer peripheral edge portion 22a of substrate 22 and other edge portion 43b of groove 41. Since light sources 21 are disposed along outer peripheral edge portion 22a of substrate 22, light sources 21 are disposed along one edge portion 43a and other edge portion 43b. With this, the light emitted by each of light sources 21 and reflected by reflective member 40 passes through gap S, and is incident on wall surface 3 of the cabin.

Other edge portion 43b includes rising wall 44 that covers light sources 21 when any given light source 21 among light sources 21, one edge portion 43a, and other edge portion 43b are viewed in a direction in which they overlap one another (when viewed in the X-axis direction or Y-axis direction). Rising wall 44 extends in the Z-axis positive direction to be closer to wall surface 3 of the cabin than one edge portion 43a is.

Gap S between outer peripheral edge portion 22a of substrate 22 and other edge portion 43b is covered by brim 12 that is light-transmissive and extends from the outer peripheral side surface of support main body 11 toward other peripheral edge portion 43b. The leading edge of brim 12, which has a substantially annular shape, abuts the leading edge of the substantially annular other edge portion 43b, specifically, rising wall 44, which has a substantially annular shape. Therefore, brim 12 is disposed to cover gap S.

Rising wall 44 extends to cover brim 12 when brim 12 and other edge portion 43b are viewed in a direction in which they overlap one another (when viewed in the X-axis direction or Y-axis direction). Therefore, when cabin illumination device 1 is turned on, rising wall 44 can reflect light transmitted from the light-transmissive brim 12 in the X-axis direction and the Y-axis direction. Accordingly, since light is transmitted from gap S between outer peripheral edge portion 22a of substrate 22 and other edge portion 43b of groove 41 and is incident on wall surface 3 of the cabin, the amount of light incident on wall surface 3 of the cabin can be secured.

As illustrated in FIG. 2, groove 41 includes first protruded surface 141 disposed to intersect the light axis of one of light sources 21, recessed surface 143 that is recessed relative to first protruded surface 141, and second protruded surface 142 that is protruded relative to recessed surface 143.

First protruded surface 141, recessed surface 143, and second protruded surface 142 are formed on inner surface 45 of groove 41. Inner surface 45 of groove 41 is formed by first side surface 45a located on the outer peripheral side of one edge portion 43_a_, second side surface 45_b_ located on the inner peripheral side of other edge portion 43_b_, and bottom surface 45_c_ (the surface located in the Z-axis negative direction) located between one edge portion 43_a_ and other edge portion 43_b_ and is opposite opening 42. Second side surface 45_b_ of other edge portion 43_b_ is opposite first side surface 45_a_ of one edge portion 43_a_, light-emitting module 20, and brim 12. On inner surface 45 of groove 41, first protruded surface 141, recessed surface 143, second protruded surface 142, and recessed surface 143 are repeatedly arranged in the stated order in the longitudinal direction of groove 41. In the present embodiment, on bottom surface 45_c_ of groove 41, first protruded surface 141, recessed surface 143, second protruded surface 142, and recessed surface 143 are repeatedly arranged in stated order in the longitudinal direction of groove 41.

Note that the heights of first protruded surface 141 and second protruded surface 142 may be the same or different. Moreover, the depth of recessed surface 143 may be the same length as, or a different in length from, the heights of first protruded surface 141 and second protruded surface 142.

First protruded surface 141 and recessed surface 143 are arranged in this order on bottom surface 45_c_ of groove 41, and therefore a portion of bottom surface 45_c_ is sloped downward in the peripheral direction of groove 41 having a substantially annular shape, which is a direction away from the intersection between the light axis and first protruded surface 141. Moreover, since recessed surface 143 and second protruded surface 142 are arranged in this order, a portion of bottom surface 45_c_ is sloped upward after being sloped downward. Furthermore, since second protruded surface 142 and recessed surface 143 are arranged in this order, a portion of bottom surface 45_c_ is sloped downward after being sloped upward. A wavy surface is formed by first protruded surface 141, recessed surface 143, second protruded surface 142, and recessed surface 143 that are repeatedly arranged in the stated order on bottom surface 45_c_ of groove 41 having a substantially annular shape. Note that the expressions "sloped downward" and "sloped upward" mean not only being sloped downward or sloped upward in the vertical direction with respect to the horizontal plane, but also being sloped in one direction or sloped in the other direction when advancing in the longitudinal direction of groove 41.

As described above, first protruded surface 141, recessed surface 143, and second protruded surface 142 on bottom surface 45_c_ of groove 41 have the following relationship with light sources 21.

Light sources 21 are arranged in one-to-one correspondence with the plurality of first protruded surfaces 141. More specifically, light sources 21 are arranged such that the light axis of each of light sources 21 and a corresponding one of first protruded surfaces 141 intersect each other. In the present embodiment, the light axis of each of light sources 21 intersects the vertex of a corresponding one of first protruded surfaces 141.

In this case, on bottom surface 45_c_ of groove 41, on which first protruded surface 141, recessed surface 143, second protruded surface 142, and recessed surface 143 are repeatedly arranged in this order, second protruded surface 142 is disposed at a position corresponding to an area between two adjacent light sources 21 among light sources 21. In other words, second protruded surface 142 is disposed at a position corresponding to an area between the light axes of two adjacent light sources 21 among light sources 21. In the present embodiment, recessed surface 143, second protruded surface 142, and recessed surface 143 are disposed at positions corresponding to an area between the light axes of two adjacent light sources 21 among light source 21. In such a configuration, since recessed surface 143 and second protruded surface 142 are disposed at positions corresponding to an area between two adjacent light sources 21 among light sources 21, the light emitted by each of light sources 21 is reflected, in the Z-axis positive direction, off the upward slope that extends from recessed surface 143 to second protruded surface 142. With this, the light emitted from each of light sources 21 and reflected off the upward slope passes through gap S, which is located between outer peripheral edge portion 22_a_ of substrate 22 and other edge portion 43_b_ of groove 41, and is incident on wall surface 3 of the cabin.

The gradient of first sloped surface 51 that extends across first protruded surface 141 and recessed surface 143 is larger than the gradient of second sloped surface 52 that extends across recessed surface 143 and second protruded surface 142. In other words, first protruded surface 141 is steeper than second protruded surface 142. With this, the traveling direction of light emitted by light source 21 and reflected off first sloped surface 51 is different from the traveling direction of the light emitted by light source 21 and reflected off second sloped surface 52. More specifically, since the incident angle and the reflection angle of light incident on and reflected off first sloped surface 51 are smaller than the incident angle and the reflection angle of light incident on and reflected off second sloped surface 52, the light reflected off first sloped surface 51 transmits farther than the light reflected off second sloped surface 52 in the peripheral direction of groove 41 having a substantially annular shape. With this, the light emitted by light sources 21 is easily mixed. The light emitted by light sources 21 and reflected by reflective member 40 can be further uniform, and is incident on wall surface 3 of the cabin.

Recessed surface 143 has a hemispherical surface shape in which a cross section of reflective member 40 taken in the arrangement direction of light sources 21 has an arc shape, and a cross section of reflective member 40 taken in a direction orthogonal to the arrangement direction of light sources 21 also has an arc shape. In other words, recessed surface 143 is formed in a hemispherical surface shape or a bowl-shaped surface.

In this case, the light emitted by each of light sources 21 is reflected off recessed surface 143 of reflective member 40 and travels toward the Z-axis positive direction. Accordingly, since light is emitted from gap S between outer peripheral edge portion 22_a_ of substrate 22 and other edge portion 43_b_ of groove 41 and is incident on wall surface 3 of the cabin, the amount of light incident on wall surface 3 of the cabin can be secured.

In such cabin illumination device 1, as indicated by the dashed line arrows in FIG. 2 and FIG. 4, the light emitted by light source 21 is incident on and reflected off reflective member 40, i.e., bottom surface 45_c_ of groove 41. The light reflected off reflective member 40 is incident on brim 12 of support member 10 that is disposed between gap S between outer peripheral edge portion 22_a_ of substrate 22 and other edge portion 43_b_ of groove 41. Since brim 12 is light-transmissive, the incident light passes through brim 12 and is incident on wall surface 3 of the cabin.

<Working Effects>

Hereinafter, working effects of cabin illumination device 1 in the present embodiment will be described.

Cabin illumination devices in recent years are desired to inhibit increase in size while inhibiting increase in manufacturing costs. For example, in the in-vehicle air purifier according to PTL 1, since a gap for LED elements is provided between the ceiling and the casing, the thickness of the in-vehicle air purifier increases. Moreover, although light emitted by the LED elements is diffused using a lens, adding the lens increase the size of the in-vehicle air purifier and increases the manufacturing costs. Therefore, the in-vehicle air purifier according to PTL 1 cannot inhibit increase in size and manufacturing costs.

In view of this, cabin illumination device 1 according to technique 1 in the present embodiment is cabin illumination device 1 that is provided on wall surface 3 of a cabin of a vehicle and illuminates the cabin. Cabin illumination device 1 includes: light source 21 disposed to emit light away from wall surface 3; and reflective member 40 disposed to intersect a light axis of light emitted by light source 21. Reflective member 40 includes first protruded surface 141 disposed to intersect the light axis of light source 21, and a portion of reflective member 40 is sloped downward in a direction away from an intersection of the light axis and first protruded surface 141.

For example, with the configuration of the related art in which a light source is disposed between the support member and the wall surface, the thickness of the cabin illumination device increases, thereby increasing the size of the cabin illumination device.

However, in the present embodiment, in order to illuminate inside the cabin by emitting light externally, light source 21 is disposed with the light axis of light being oriented in the direction perpendicular to wall surface 3 of the cabin, and reflective member 40 is disposed opposite light source 21. This makes it possible to illuminate wall surface 3 of the cabin, and thus light source 21 is not necessary disposed between support member 10 and wall surface 3. Since light source 21 and reflective member 40 can be disposed at different positions, increase in the thickness of cabin illumination device 1 can be inhibited.

Moreover, with such an arrangement of light source 21 and reflective member 40, the light emitted by light source 21 is reflected by reflective member 40, and incident on wall surface 3 of the cabin. In the present embodiment, the length of the path of the light emitted by light source 21 can be increased, compared with when the light emitted by the light source is directly incident on the wall surface of the cabin. With this, it is not necessary to diffuse light emitted by a light source by using a lens as in the related art. As a result, increase in size and the manufacturing costs of cabin illumination device 1 can be inhibited.

Therefore, with cabin illumination device 1, increase in size and manufacturing costs can be inhibited.

Moreover, cabin illumination device 1 according to technique 2 in the present embodiment is cabin illumination device 1 according to technique 1. In this case, reflective member 40 further includes recessed surface 143 that is recessed relative to first protruded surface 141, and first protruded surface 141 and recessed surface 143 of reflective member 40 are arranged in stated order.

With this, the traveling direction of the light emitted by light source 21 and reflected off first protruded surface 141 is different from the traveling direction of the light emitted by light source 21 and reflected off recessed surface 143. Since the light emitted by light source 21 and reflected by reflective member 40 is easily mixed, the light reflected by reflective member 40 easily becomes further uniform and is easily incident on wall surface 3 of the cabin. As a result, it is possible to inhibit luminance unevenness of the light incident on wall surface 3 of the cabin.

Moreover, cabin illumination device 1 according to technique 3 in the present embodiment is cabin illumination device 1 according to technique 2. In this case, reflective member 40 further includes second protruded surface 142 that is protruded relative to recessed surface 143, first protruded surface 141, recessed surface 143, and second protruded surface 142 of reflective member 40 are arranged in stated order, and a gradient of first sloped surface 51 that extends across first protruded surface 141 and recessed surface 143 is larger than a gradient of second sloped surface 52 that extends across recessed surface 143 and second protruded surface 142.

With this, since the incident angle and the reflection angle of light incident on and reflected off first sloped surface 51 are smaller than the incident angle and the reflection angle of light incident on and reflected off second sloped surface 52, the light reflected off first sloped surface 51 transmits farther than the light reflected off second sloped surface 52. Since the light beams emitted by light source 21 and reflected off reflective member 40 are easily mixed, the light beams reflected by reflective member 40 are further uniform and incident on wall surface 3 of the cabin. As a result, it is possible to inhibit luminance unevenness of the light incident on wall surface 3 of the cabin.

Moreover, cabin illumination device 1 according to technique 4 in the present embodiment is cabin illumination device 1 according to technique 3. In this case, cabin illumination device 1 includes a plurality of light sources 21 each being light source 21. Second protruded surface 142 is disposed at a position corresponding to an area between two adjacent light sources 21 among the plurality of light sources 21.

For example, when the light sources are disposed above the second protruded surface in the Z-axis positive direction, the light emitted by the light sources does not easily travel far in the arrangement direction of the light sources compared to the light reflected off the first protruded surface, even when the light is reflected off the second protruded surface. This is because the gradient of the second protruded surface is gentler than the gradient of the first protruded surface.

However, in the present embodiment, second protruded surface 142 is disposed at a position corresponding to an area between two adjacent light sources 21, wall surface 3 located directly above second protruded surface 142 (in the Z-axis positive direction) will not be too bright. Therefore, the light emitted by light sources 21 and reflected by reflective member 40 can be further uniform, and is incident on wall surface 3 of the cabin. As a result, it is possible to inhibit luminance unevenness of the light incident on wall surface 3 of the cabin. Moreover, one second protruded surface 142 can form two second sloped surfaces 52 that can each reflect light emitted by a corresponding one of two adjacent light sources 21.

Moreover, cabin illumination device 1 according to technique 5 in the present embodiment is cabin illumination device 1 according to technique 1. In this case, reflective member 40 further includes recessed surface 143 that is recessed relative to first protruded surface 141 and second protruded surface 142 that is protruded relative to recessed surface 143, and first protruded surface 141, recessed surface 143, second protruded surface 142, and recessed surface 143 of reflective member 40 are repeatedly arranged in stated order.

With this, the light reflected by reflective member 40 and made further uniform can be incident on wall surface 3 of the cabin in the longitudinal direction of groove 41. As a result, it is possible to inhibit luminance unevenness of the light incident on wall surface 3 of the cabin.

Moreover, cabin illumination device 1 according to technique 6 in the present embodiment is cabin illumination device 1 according to any one of techniques 1 to 3. In this case, cabin illumination device 1 includes a plurality of light sources 21 each being light source 21. The plurality of light sources 21 are arranged in one-to-one correspondence with a plurality of first protruded surfaces 141 each being the first protruded surface 141.

With this, the light of each of light sources 21 can be reflected by reflective member 40 and more uniform light can be incident on wall surface 3 of the cabin. As a result, it is possible to inhibit luminance unevenness of the light incident on wall surface 3 of the cabin.

Moreover, cabin illumination device 1 according to technique 7 in the present embodiment is cabin illumination device 1 according to technique 4 or 6. In this case, recessed surface 143 has a hemispherical surface shape in which a cross section of reflective member 40 taken in an arrangement direction of the plurality of light sources 21 has an arc shape, and a cross section of reflective member 40 taken in a direction orthogonal to the arrangement direction of the plurality of light sources 21 also has an arc shape.

With this, in the arrangement direction of light sources 21, the traveling direction of the light emitted by each light source 21 and reflected off first sloped surface 51 is different from the traveling direction of the light emitted by each light source 21 and reflected off second sloped surface 52. Therefore, the light emitted by light sources 21 is easily mixed. With this, the light emitted by light sources 21 and reflected by reflective member 40 can be further uniform easily, and is easily incident on wall surface 3 of the cabin.

Moreover, in the direction orthogonal to the arrangement direction of light sources 21, the light emitted by each of light sources 21 is reflected off recessed surface 143 of reflective member 40 and easily travels toward wall surface 3 of the cabin. Accordingly, since light passes through gap S between outer peripheral edge portion 22*a* of substrate 22 and other edge portion 43*b* of groove 41 and is easily incident on wall surface 3 of the cabin, the amount of light incident on wall surface 3 of the cabin can be secured.

Moreover, cabin illumination device 1 according to technique 8 in the present embodiment is cabin illumination device 1 according to technique 7. In this case, reflective member 40 includes groove 41 provided in the arrangement direction of the plurality of light sources 21, on inner surface 45 of groove 41, first protruded surface 141, recessed surface 143, second protruded surface 142, and recessed surface 143 are repeatedly arranged in stated order in a longitudinal direction of groove 41, and the plurality of light sources 21 are disposed in groove 41.

With this, the light reflected by reflective member 40 and made further uniform can be incident on wall surface 3 of the cabin in the longitudinal direction of groove 41. As a result, it is possible to inhibit luminance unevenness of the light incident on wall surface 3 of the cabin.

Moreover, since the plurality of light sources 21 can be disposed in groove 41, increase in the thickness of cabin illumination device 1 can be inhibited. Therefore, increase in size of cabin illumination device 1 can be inhibited.

Moreover, cabin illumination device 1 according to technique 9 in the present embodiment is cabin illumination device 1 according to technique 8. In this case, groove 41 includes one edge portion 43*a* and other edge portion 43*b* that define opening 42, one edge portion 43*a* is opposite other edge portion 43*b* with opening 42 in between, the plurality of light sources 21 are disposed along one edge portion 43*a*, and other edge portion 43*b* includes rising wall 44 that extends to cover the plurality of light sources 21, rising wall 44 extending in a direction opposite to a direction of light emitted by each of the plurality of light sources 21 along the light axis, rising wall 44 covering any given light source 21 among the plurality of lights sources 21 when viewed in a direction in which the given light source 21 and one edge portion 43*a* are arranged.

With this, when cabin illumination device 1 is turned on, rising wall 44 having a function of reflecting light can reflect light traveling in the X-axis direction and the Y-axis direction. Since light passes through gap S between outer peripheral edge portion 22*a* of substrate 22 and other edge portion 43*b* of groove 41 and is easily incident on wall surface 3 of the cabin, the amount of light incident on wall surface 3 of the cabin can be secured.

Moreover, cabin illumination device 1 according to technique 10 in the present embodiment is cabin illumination device 1 according to technique 9. In this case, cabin illumination device 1 includes substrate 22 on which the plurality of light sources 21 are provided; and support member 10. Support member 10 includes: support main body 11 that supports substrate 22 and is provided on wall surface 3 of the cabin; and brim 12 that is light-transmissive, extends from support main body 11 toward other edge portion 43*b*, and abuts other edge portion 43*b*.

With this, brim 12 can cover gap S between other edge portion 43*b* and substrate 22, thereby making it difficult for foreign matter to enter inside groove 41. As a result, it is possible to inhibit luminance unevenness of the light incident on wall surface 3 of the cabin.

Moreover, cabin illumination device 1 according to technique 11 in the present embodiment is cabin illumination device 1 according to technique 10. In this case, rising wall 44 extends to cover brim 12 when viewed in a direction in which brim 12 and other edge portion 43*b* are arranged.

With this, when cabin illumination device 1 is turned on, rising wall 44 having a function of reflecting light can reflect light traveling from brim 12 in the X-axis direction and the Y-axis direction. Since light passes through gap S between outer peripheral edge portion 22*a* of substrate 22 and other edge portion 43*b* of groove 41 and is easily incident on wall surface 3 of the cabin, the amount of light incident on wall surface 3 of the cabin can be secured.

Other Variations

Although the cabin illumination device according to the present disclosure has been described based on the one or more embodiments described above, the present disclosure should not be construed to be limited to the one or more embodiments described above. The scope of the present disclosure may encompass embodiments as a result of making, to the one or more embodiments, various modifications that may be conceived by those skilled in the art, as long as the resultant embodiments do not depart from the spirit of the present disclosure.

Note that, embodiments obtained as a result of various modifications that may be conceived by those skilled in the art to the above-described one or more embodiments and embodiments implemented by any combination of the structural elements and functions shown in the above one or more embodiments without departing from the spirit of the present disclosure are also included within the scope of the present disclosure.

While various embodiments have been described herein above, it is to be appreciated that various changes in form and detail may be made without departing from the spirit and scope of the present disclosure as presently or hereafter claimed.

FURTHER INFORMATION ABOUT
TECHNICAL BACKGROUND TO THIS
APPLICATION

The disclosure of the following patent application including specification, drawings, and claims are incorporated herein by reference in their entirety: Japanese Patent Application No. 2024-055887 filed on Mar. 29, 2024.

INDUSTRIAL APPLICABILITY

The present disclosure is applicable to, for example, an illumination device in a cabin of a movable object, such as a vehicle.

The invention claimed is:

1. A cabin illumination device that is configured to be provided on a wall surface of a cabin of a vehicle and illuminate the cabin, the cabin illumination device comprising:
   a plurality of light sources disposed to emit light away from the wall surface; and
   a reflective member disposed to intersect light axes of light emitted by the plurality of light sources, wherein the reflective member includes:
      a first protruded surface directly underlying a first light source of the plurality of light sources;
      a second protruded surface;
      a first recessed surface that is connected between the first and second protruded surfaces and that is recessed relative to the first and second protruded surfaces;
      a third protruded surface directly underlying a second light source of the plurality of light sources; and
      a second recessed surface that is connected between the second and third protruded surfaces and that is recessed relative to the second and third protruded surfaces,
   a gradient of a first sloped surface that extends across the first protruded surface and the first recessed surface is larger than a gradient of a second sloped surface that extends across the first recessed surface and the second protruded surface, and
   a gradient of a third sloped surface that extends across the second protruded surface and the second recessed surface is smaller than a gradient of a fourth sloped surface that extends across the second recessed surface and the third protruded surface.

2. The cabin illumination device according to claim 1, wherein the second protruded surface is disposed at a position corresponding to an area between the first and second light sources that are adjacent to each other.

3. The cabin illumination device according to claim 1, wherein
   the first and second recessed surfaces have a hemispherical surface shape in which a cross section of the reflective member taken in an arrangement direction of the plurality of light sources has an arc shape, and a cross section of the reflective member taken in a direction orthogonal to the arrangement direction of the plurality of light sources also has an arc shape.

4. The cabin illumination device according to claim 3, wherein
   the reflective member includes a groove provided in the arrangement direction of the plurality of light sources,
   on an inner surface of the groove, the first protruded surface, the first recessed surface, the second protruded surface, the second recessed surface, and the third protruded surface are repeatedly arranged in stated order in a longitudinal direction of the groove, and
   the plurality of light sources are disposed in the groove.

5. The cabin illumination device according to claim 4, wherein
   the groove includes one edge portion and an other edge portion that define an opening,
   the one edge portion is opposite the other edge portion with the opening in between,
   the plurality of light sources are disposed along the one edge portion, and
   the other edge portion includes a rising wall that extends to cover the plurality of light sources, the rising wall extending in a direction opposite to a direction of light emitted by each of the plurality of light sources along the light axes, the rising wall covering any given light source among the plurality of lights sources when viewed in a direction in which the given light source and the one edge portion are arranged.

6. The cabin illumination device according to claim 5, comprising:
   a substrate on which the plurality of light sources are provided; and
   a support member, wherein
   the support member includes: a support main body that supports the substrate and is provided on the wall surface of the cabin; and a brim that is light-transmissive, extends from the support main body toward the other edge portion, and abuts the other edge portion.

7. The cabin illumination device according to claim 6, wherein
   the rising wall extends to cover the brim when viewed in a direction in which the brim and the other edge portion are arranged.

8. The cabin illumination device according to claim 1, wherein the first protruded surface and the third protruded surface have the same height.

9. The cabin illumination device according to claim 1, wherein the first and second light sources are aligned with each other.

10. A cabin illumination device that is configured to be provided on a wall surface of a cabin of a vehicle and illuminate the cabin, the cabin illumination device comprising:
   a plurality of light sources disposed to emit light away from the wall surface; and
   a reflective member disposed to intersect a light axis of light emitted by a light source of the plurality of light sources, wherein
   the reflective member includes:
      a first protruded surface disposed to intersect the light axis of the light source;
      a recessed surface that is recessed relative to the first protruded surface; and
      a second protruded surface that is protruded relative to the recessed surface,
   a portion of the reflective member is sloped downward in a direction away from an intersection of the light axis and the first protruded surface, the first protruded surface, the recessed surface, and the second protruded surface of the reflective member are arranged in stated order, a gradient of a first sloped surface that extends across the first protruded surface and the recessed surface is larger than a gradient of a second sloped surface that extends across the recessed surface and the second protruded surface, the second protruded surface is disposed at a position corresponding to an area between two adjacent light sources among the plurality of light sources, and the recessed surface has a hemispherical surface shape in which a cross section of the reflective member taken in an arrangement direction of the plurality of light sources has an arc shape, and a cross section of the reflective member taken in a direction orthogonal to the arrangement direction of the plurality of light sources also has an arc shape.

11. The cabin illumination device according to claim 10, wherein the first protruded surface, the recessed surface, the second protruded surface, and another recessed surface of the reflective member are repeatedly arranged in stated order.

12. The cabin illumination device according to claim 10, wherein the plurality of light sources are arranged in one-to-one correspondence with a plurality of first protruded surfaces each being the first protruded surface.

13. The cabin illumination device according to claim 10, wherein the reflective member includes a groove provided in the arrangement direction of the plurality of light sources, on an inner surface of the groove, the first protruded surface, the recessed surface, the second protruded surface, and another recessed surface are repeatedly arranged in stated order in a longitudinal direction of the groove, and the plurality of light sources are disposed in the groove.

14. The cabin illumination device according to claim 13, wherein the groove includes one edge portion and an other edge portion that define an opening, the one edge portion is opposite the other edge portion with the opening in between, the plurality of light sources are disposed along the one edge portion, and the other edge portion includes a rising wall that extends to cover the plurality of light sources, the rising wall extending in a direction opposite to a direction of light emitted by each of the plurality of light sources along the light axes, the rising wall covering any given light source among the plurality of lights sources when viewed in a direction in which the given light source and the one edge portion are arranged.

15. The cabin illumination device according to claim 14, comprising:

a substrate on which the plurality of light sources are provided; and a support member, wherein the support member includes: a support main body that supports the substrate and is provided on the wall surface of the cabin; and a brim that is light-transmissive, extends from the support main body toward the other edge portion, and abuts the other edge portion.

16. The cabin illumination device according to claim 15, wherein the rising wall extends to cover the brim when viewed in a direction in which the brim and the other edge portion are arranged.

* * * * *